Aug. 3, 1948.  P. S. WEBSTER  2,446,348
PISTON
Filed March 21, 1946
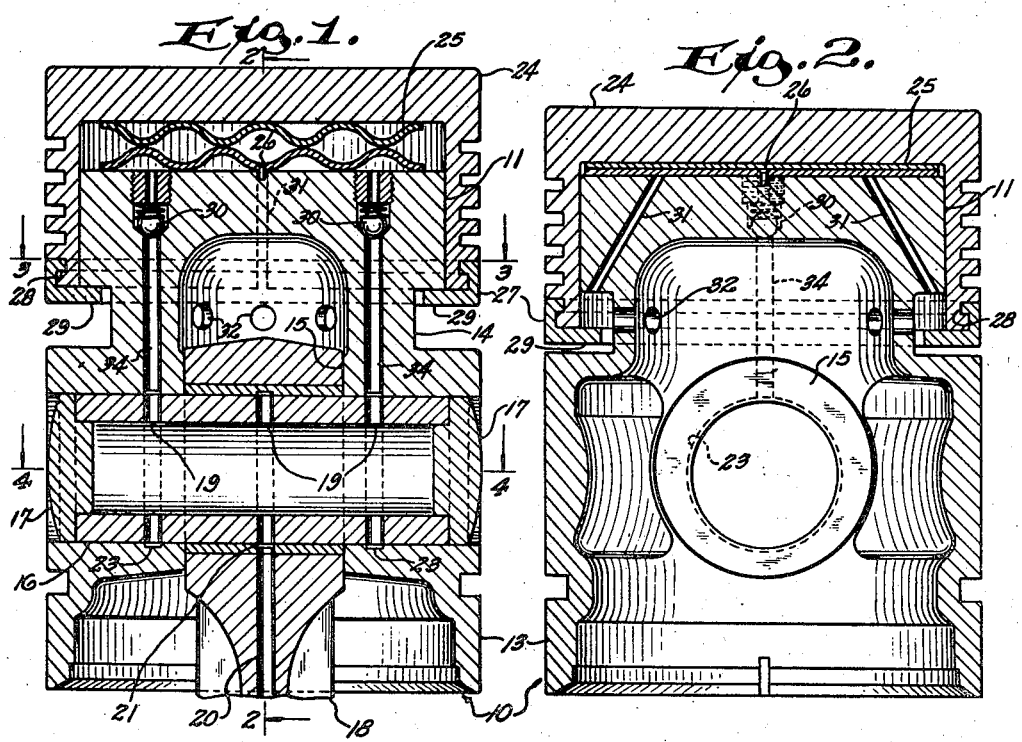
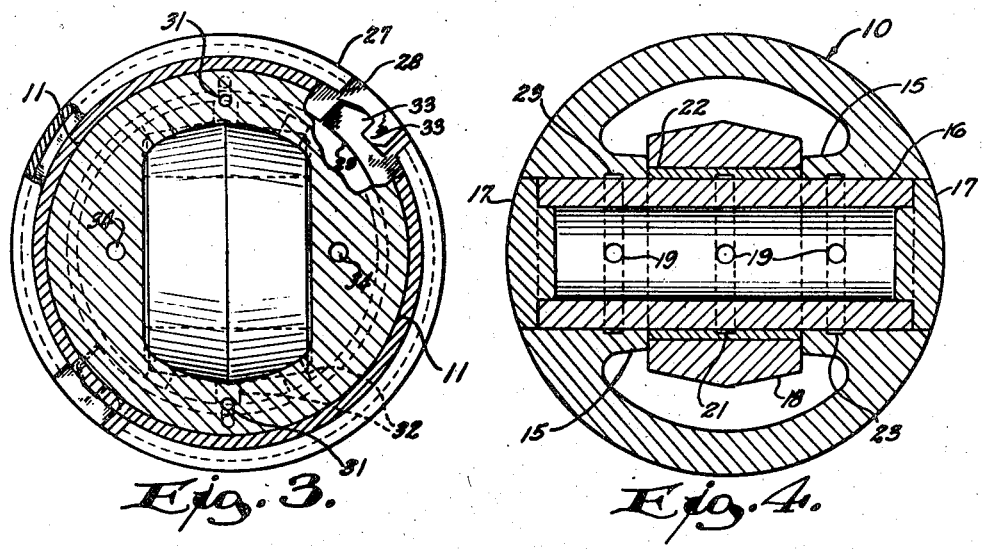
INVENTOR.
PHILIP S. WEBSTER
BY John W. Michael
ATTORNEY.

Patented Aug. 3, 1948

2,446,348

UNITED STATES PATENT OFFICE 2,446,348

PISTON

Philip S. Webster, North Muskegon, Mich.

Application March 21, 1946, Serial No. 655,944

5 Claims. (Cl. 123—176)

This invention relates to improvements in pistons for internal combustion engines and more particularly to liquid cooled pistons of the flexible dome type.

Flexible dome pistons are particularly advantageous in that they prevent excessive pressure in the combustion chamber during the combustion cycle. Liquid cooled pistons are advantageous in that they prevent the formation of localized hot spots. Both of these characteristics tend to prevent detonation and permit the use of lower grade fuel.

It is therefore an object of this invention to provide a piston which tends to prevent detonation.

Another object of this invention is to provide a flexible dome piston, the dome of which is liquid cooled.

A further object of the invention is to provide a piston in which the dome is flexible, liquid cooled and the lateral thrust faces of the piston are lubricated by the cooling medium.

A still further object of the invention is to provide a piston which will have minimum wear in the upper portion and maintain the proper piston ring alignment at all times.

These objects are obtained by providing the piston with a dome which has a sliding fit over the head of the piston trunk and is constantly urged to extended position by a spring of sufficient force to resist flexing of the dome toward the head except during the combustion cycle. The space between the dome and the head, when in the extended position of the dome, is supplied with lubricant under pressure. Inlet feed lines extending from the piston pin to this space are provided with check valves, and outlet feed lines from this space extend to the lateral thrust sides of the piston trunk where they are closed or opened by the movement of the dome. Lubricant under pressure is supplied to the piston pin in the customary manner. When the dome is extended, as during all but the combustion cycle, the space below it and between it and the head is filled with liquid lubricant which is fed through the inlet lines. During the combustion cycle, the dome is compressed against the head, and the liquid lubricant in said space is forced out through the outlet feed lines to the lateral thrust sides of the piston trunk, the check valves preventing movement of the lubricant from said space to the inlet lines. A reservoir for a predetermined amount of such lubricant is provided in such sides so that the lateral thrust faces of the piston are always supplied with lubricant. The excess amount of lubricant in such reservoir is drained to the crank case through the interior of the trunk. The dome is retained on the head of the trunk by a locking ring which also provides a bearing for absorbing the upper component of the lateral thrust force acting on the piston. Thus the piston flexes to prevent excessive pressure in the combustion chamber during the combustion cycle, while such flexing aids in cooling the dome of the piston and maintenance of an evenly distributed moderate temperature as well as positive lubrication of the lateral thrust faces of the piston. Its useful life is lengthened by the prevention of undue wear on the upper portion by the action of the dome locking ring.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawing, in which:

Figure 1 is a cross-sectional view of a piston embodying the invention taken on the axis of the piston pin;

Figure 2 is a sectional view taken on the line 2—2 of Figure 1, but with the piston pin and connecting rod removed for the sake of clarity in illustration;

Figure 3 is a sectional view taken on the line 3—3 of Figure 1, with fragmentary parts broken away for the sake of clarity; and Figure 4 is a sectional view taken on the line 4—4 of Figure 1.

Referring more particularly to the drawings, the piston comprises a trunk 10 having a head 11 and a skirt 13. The head is connected to the body by a neck 14. The diameter of the head 11 is less than the diameter of the skirt 13 and the diameter of the neck 14 is less than the diameter of the head 11. The neck 14 forms a circular recess extending around the trunk 10. The trunk 10 is provided with the customary pin bosses 15.

A full floating hollow piston pin 16 of the conventional type, having its ends plugged with aluminum heads 17, fits in the bearing portion of the bosses 15 to hold in place the connecting rod 18. The pin 16 is provided with oil holes 19 leading from its interior to its exterior. One set of holes is centrally located and communicates with the groove 21. The other two sets communicate with respective grooves 23 in the bosses 15. As is standard practice, the connecting rod 18 has an oil line 20 drilled longitudinally thereof which is in alinement with a circular oil groove 21 formed in the connecting rod bushing 22. By means of this, oil under pressure is transmitted to the interior of the pin 16. Each of the bosses 15 is provided with an oil groove 23 for the purposes hereinafter described.

A dome 24 has depending skirts which have a sliding fit around the sides of head 11. In the preferred embodiment this dome is made of copper aluminum alloy and has the customary ring belt formed in the outer surfaces of its depending skirt in which standard piston rings (not shown) are carried. Before the dome is inserted over the head 11, there is positioned on the head a circular-shaped bellows type spring 25 which is located on the head 11 by a centering pin 26. This bellows type of spring is made of spring steel and has sufficient tension to maintain the dome in the extended position shown in Figure 1 during all but the combustion cycle. In the combustion cycle the force of combustion compresses the spring 25 and moves the dome 24 to the compressed position shown in Figure 2.

In order to keep the dome 24 on the head 11 there is provided a locking ring 27 made in two parts and preferably formed of cast iron or steel. The locking ring 27 has an upper internally projecting flange 28 which fits in a groove formed at the lower end of the skirt of the dome 24. It also has a lower inwardly projecting flange 29 which extends inwardly of and abuts against the bottom of the head 11 to keep the dome 24 from moving outwardly with respect to the head. Each half of the locking ring is provided with similarly shaped dogs 33 which interlock with each other, as shown in Figure 3, when the two halves of the ring are forcibly snapped together. The ring 27 is assembled when the piston is compressed a sufficient amount to permit the flange 29 to enter below the bottom of head 11. The ring 27 also acts as a bearing and guide for the dome and prevents the dome from rubbing against the cylinder walls. As it is spaced above the skirt 13 and the center line of the pin 16, it absorbs the upper component of the lateral thrust for acting on the piston and takes the wear which would otherwise be imparted to the upper portion of the piston. To disengage the dome 24 from the head, it is only necessary to spring the dogs 33 of one section of the locking ring sufficiently to disengage them from the dogs 33 of the other section, whereupon both sections of the ring may be removed laterally of the dome and trunk. The length of the skirt of the dome is proportioned to the thickness of the head 11 so that when the spring 25 is fully compressed the flange 29 will be spaced from the top of the skirt 13. Space is provided between the neck 14 and the inner edge of the flange 29 for the purpose of permitting the passage of oil therebetween.

In order to keep the temperature of the dome 24 evenly distributed and moderate during the operation of the piston, provision is made for the passing of fresh cooling oil through the space between the head 11 and the top of the dome 24. The continuous circulation of lubricating oil through this space absorbs heat from the top of the dome and disburses it nearly uniformly throughout the piston, thus preventing the formation of localized hot spots on the dome which tend to cause knocking and detonation. To accomplish this in connection with the flexing of the dome during the combustion cycle, the piston trunk is provided with oil lines 34 extending from the grooves 23 upwardly to the top of the head 11. At their upper ends, each line is provided with a conventional ball check designated generally at 30. Through these lines the oil under pressure in the pin 16 is also supplied to the space above the head 11 during all but the combustion cycle. Exhaust oil lines 31 extend radially outward, as shown in Figure 2, from the top of the head 11 to the bottom of the head 11 at the lateral thrust sides of the piston. When the head 11 is extended as shown in Figure 1, the lower end of the lines 31 is closed by the flange 29, thus retaining the oil in the space below the dome. However, when the dome is compressed toward the head 11 during the combustion cycle, the lower ends of the oil lines 31 are opened and the oil in the space between the dome and the head is forced outwardly through the lines 31 into the recess formed at the neck 14. The oil carried in this recess is continuously in contact with the cylinder wall opposite the lateral thrust faces of the trunk, thus lubricating that wall and the lateral thrust faces of the piston. However, in order to prevent an excess supply of oil in this recess, and in order to prevent the creation of back pressure, oil holes 32 extend from the surface of the neck 14 into the interior of the trunk. Oil passing through these holes drains to the crank case of the engine. As the dome is alternately compressed and extended with reference to the head 11, the movement of the dome toward and away from the head 11 in connection with the check valve 30 acts as a pump aiding in pumping the oil out of the space under the dome. This aids the pressure system in accomplishing the continuous circulation of cooling oil and eliminates the need of an auxiliary oil dump.

Although only one embodiment of the invention is shown and described herein, it will be understood that this application is intended to cover such changes or modifications as come within the spirit of the invention or scope of the following claims.

I claim:

1. A piston comprising a trunk provided with a head, a recess extending around said trunk below said head to form a lower surface on said head, a dome having a skirt portion slidably fitted over said head, spring means for maintaining said dome spaced from said head during all conditions except that existing in a combustion cycle, a locking ring detachably engageable with the skirt of said dome, said ring having a portion operable in said recess and engageable with said lower surface to limit the extended movement of said dome, an oil passageway leading to the top of said head, a check valve in said passage at the top of said head to prevent oil from being forced into said passage from the space between said dome and said head, and an oil passage extending from the top of said head to said lower surface at a point adapted to be closed by said flange in the extended position of said dome.

2. A piston having a trunk provided with piston pin bosses, a hollow piston pin mounted in said bosses, an oil passage extending from the interior of one of said bosses to the top of said trunk, a check valve in said passage positioned to open upwardly to permit liquid to pass from said boss and to said top end of said passageway, means for conveying oil from the interior of said pin to said passageway, a dome flexibly carried by said trunk and movable to extended position to provide a space below the top of said dome and above the top of said trunk into which a cooling lubricant may be delivered from said passage-way, and an outlet from said space normally closed when said dome is in fully extended position.

3. A piston comprising a trunk provided with bearings for a piston pin, a recess in the exterior wall of said trunk, a dome movably mounted on said trunk, a groove in the outer surface of said dome, and a locking ring having an upper internal flange fitting into said groove and a lower internal flange extending into said recess, said ring having an outer bearing surface spaced above said bearings whereby said ring limits the outward flexing of said dome and provides a bearing for the upper component of lateral thrust on said piston.

4. A piston comprising a trunk provided with bearings for a piston pin, a recess in the exterior wall of said trunk, a dome movably mounted on said trunk, a groove in the outer surface of said dome, and a locking ring having an upper internal flange fitting into said groove and a lower internal flange extending into said recess, said ring having an outer bearing surface spaced above said bearings whereby said ring limits the outward flexing of said dome and provides a bearing for the upper component of lateral thrust on said piston and at the same time maintains the dome portion concentric with the cylinder walls.

5. A piston having a trunk provided with piston pin bosses, a hollow piston pin mounted in said bosses, an oil passage extending from the interior of one of said bosses to the top of said trunk, a check valve in said passage positioned to open upwardly to permit oil to pass from said boss to the top of said trunk, means for conveying oil from the interior of said hollow pin to said passage, a dome carried by said trunk and movable from contracted to extended position to provide a space below the top of said dome and above the top of said trunk into which oil may be delivered from said passage, and a discharge passage for directing oil from said space.

PHILIP S. WEBSTER.

REFERENCES CITED

The following references are of record in the file of this patent:

UNITED STATES PATENTS

| Number | Name | Date |
|---|---|---|
| 1,825,163 | Schweter | Sept. 29, 1931 |
| 1,856,107 | Mellor | May 3, 1932 |
| 2,407,429 | Kuttner | Sept. 10, 1946 |

FOREIGN PATENTS

| Number | Country | Date |
|---|---|---|
| 38,607 | Netherlands | 1936 |